US009043335B2

(12) United States Patent  
Chen

(10) Patent No.: US 9,043,335 B2
(45) Date of Patent: May 26, 2015

(54) ELECTRONIC DEVICE AND METHOD FOR MANAGING NAMES OF ELECTRONIC DEVICE

(71) Applicant: Chi Mei Communication Systems, Inc., New Taipei (TW)

(72) Inventor: Yen-An Chen, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 225 days.

(21) Appl. No.: 13/864,285

(22) Filed: Apr. 17, 2013

(65) Prior Publication Data

US 2013/0282732 A1    Oct. 24, 2013

(30) Foreign Application Priority Data

Apr. 23, 2012 (TW) .............................. 101114304 A

(51) Int. Cl.
*G06F 17/30* (2006.01)
*H04M 1/725* (2006.01)

(52) U.S. Cl.
CPC ............ *G06F 17/3033* (2013.01); *G06F 17/30* (2013.01); *H04M 1/72519* (2013.01); *H04M 2250/12* (2013.01)

(58) Field of Classification Search
CPC ................... G06F 17/30949; G06F 17/30067
USPC ........................................................ 707/747
See application file for complete search history.

(56) References Cited

U.S. PATENT DOCUMENTS

| 7,907,901 | B1 * | 3/2011 | Kahn et al. .................. 455/41.2 |
| 8,228,292 | B1 * | 7/2012 | Ruiz et al. ................... 345/156 |
| 8,843,642 | B2 * | 9/2014 | Shen et al. ................... 709/227 |
| 2009/0017799 | A1 * | 1/2009 | Thorn ........................ 455/414.1 |
| 2011/0083111 | A1 * | 4/2011 | Forutanpour et al. ......... 715/863 |
| 2012/0154294 | A1 * | 6/2012 | Hinckley et al. .............. 345/173 |
| 2013/0147704 | A1 * | 6/2013 | Kuo et al. .................... 345/156 |
| 2013/0154926 | A1 * | 6/2013 | Kim et al. .................... 345/157 |
| 2013/0273888 | A1 * | 10/2013 | Chou et al. ................... 455/411 |

OTHER PUBLICATIONS

Article by Tom Simonite, 14:00 Nov. 13, 2007, "Synchronized shaking connects gadgets securely".Video: Holding two gadgets together and giving them a shake provides an easier and more secure way to link them wirelessly. http://www.newscientist.com/article/dn12912-synchronised-shaking-connects-gadgets-securely.html.*

* cited by examiner

*Primary Examiner* — Rehana Perveen
*Assistant Examiner* — Hicham Skhoun
(74) *Attorney, Agent, or Firm* — Novak Druce Connolly Bove + Quigg LLP

(57) ABSTRACT

In a method for naming an electronic device, a hash table including indices and corresponding character strings is preset. The electronic device is controlled to enter into a searchable state, and inserts a default name of the electronic device in a searchable device list. A shaking angle of the electronic device is calculated according to detected coordinate values acquired from a gravity sensor, when the electronic device is shaking in the searchable state and the default name needs to be changed. A hash value is calculated using the shaking angle, a UNIX timestamp, a number of the indices in the hash table, and a predetermined formula. The method further determines an index that is the same as the hash value, determines a character string corresponding to the determined index, and renames the electronic device using the determined character string.

18 Claims, 5 Drawing Sheets

| Index | Character string |
|---|---|
| 1 | I am Hank. |
| 2 | Hi, are you looking for me? I am here. |
| 3 | ***** Hey, I am here. ***** |
| ... | ... |
| 51 | @I am Tom@ |
| ... | ... |
| N | Please choose me to establish a connection. |

FIG. 3

ELECTRONIC DEVICE AND METHOD FOR MANAGING NAMES OF ELECTRONIC DEVICE

BACKGROUND

1. Technical Field

Embodiments of the present disclosure relate to management technology, and particularly to an electronic device and method for managing names of the electronic device.

2. Description of Related Art

Multiple electronic devices may be connected to exchange data. For example, the electronic devices may establish a data connection (e.g., a BLUETOOTH connection, a WIFI connection) to transmit files. Before establishing the data connection, an electronic device needs to search for a target electronic device, and sends a connection request to the target electronic device. Generally, the electronic device has to find the target electronic device in a searchable device list. However, the searchable device list may have many device names. That is, it is inefficient for a user of the electronic device to find the target electronic device to establish the data connection. Therefore, an efficient method for managing names of electronic device is desired.

BRIEF DESCRIPTION OF THE DRAWINGS

FIG. 3 is a chart of one embodiment of a hash table preset by the naming system.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
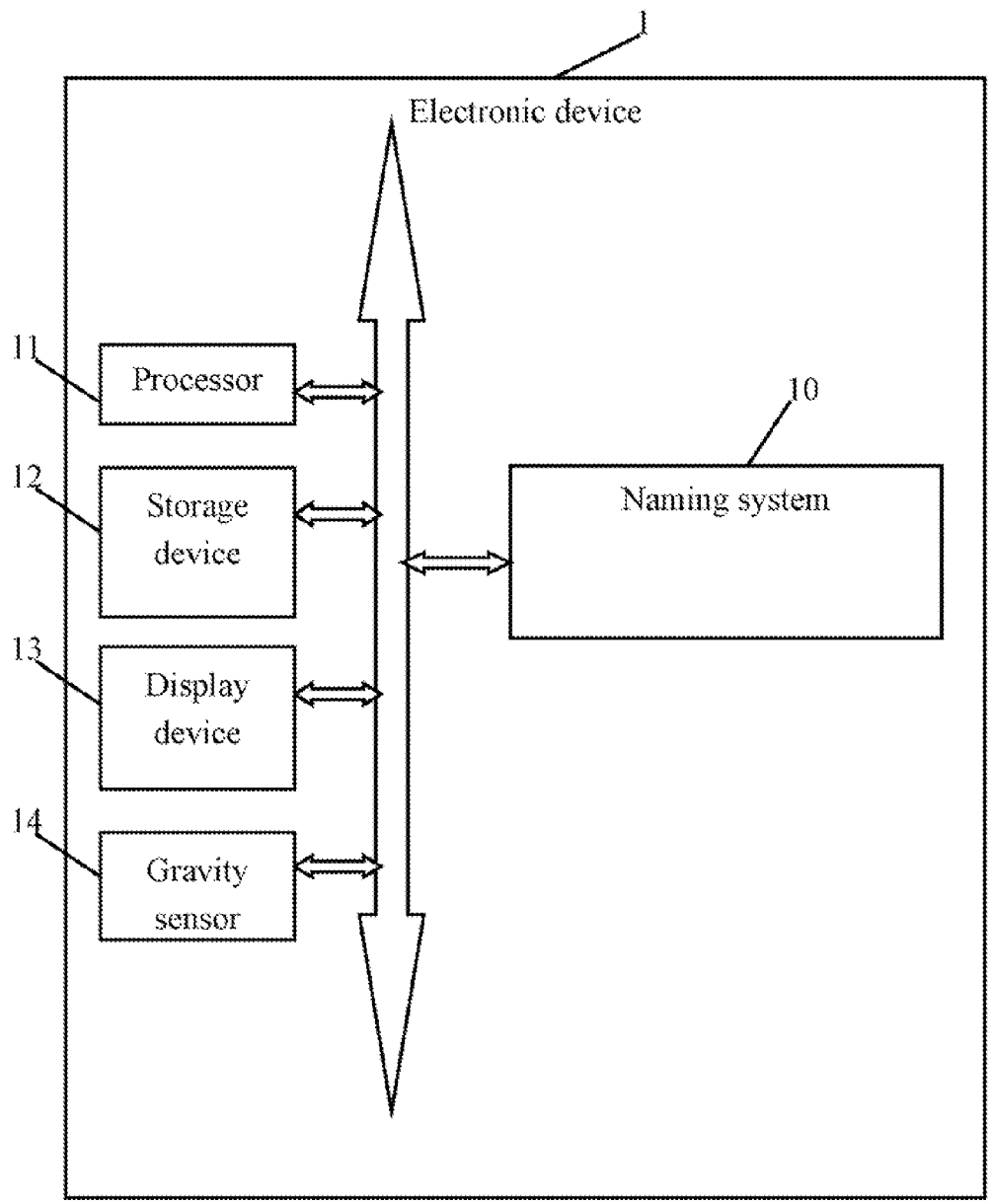
FIG. 1 is a block diagram of one embodiment of an electronic device including a naming system.

FIG. 1 is a block diagram of one embodiment of an electronic device 1 including a naming system 10. The electronic device 1 further includes at least one processor 11, a storage device 12, a display device 13, and a gravity sensor 14. FIG. 1 illustrates only one example of the electronic device 1 that may include more or fewer components than illustrated, or have a different configuration of the various components in other embodiments.

The naming system 10 recognizes a user gesture (e.g., a shaking gesture) and generates a corresponding naming parameter when the electronic device 1 needs to establish a data connection with other electronic devices, and names/renames the electronic device 1 using the naming parameter, thereby making a new name of the electronic device 1 easily found by other electronic devices.

For example, it is assumed that the electronic device 1 needs to connect to an electronic device "A," a user of the electronic device 1 may hold the electronic device 1 to perform a predetermined gesture, such as, shaking the electronic device 1. The naming system 10 may recognize the performed gesture and then rename the electronic device 1. For example, the electronic device 1 may be renamed using one of preset names, such as, "I am Hank," or "Hey, I am here." Then the electronic device "A" may recognize the electronic device 1 according to the new name.

In one embodiment, the electronic device 1 may be a mobile phone, a tablet computer, a personal digital assistant, a notebook computer, or any other device. In one embodiment, the naming system 10 may include computerized instructions in the form of one or more programs that are executed by the at least one processor 11 and stored in the storage device 12. The storage device 12 stores one or more programs, such as operating systems, applications of the electronic device 1, and various kinds of data, such as images. In some embodiments, the storage device 12 may be an external storage card, such as a memory stick, a smart media card, a compact flash card, a secure digital card, or any other type of memory storage device.

The display device 13 may be a liquid crystal display (LCD) or a touch-sensitive display (a capacitive touch panel), for example. The gravity sensor 14 may be used to measure a tilt angle, vibration, dynamic distance and speed, and other parameters.

Figure 2:
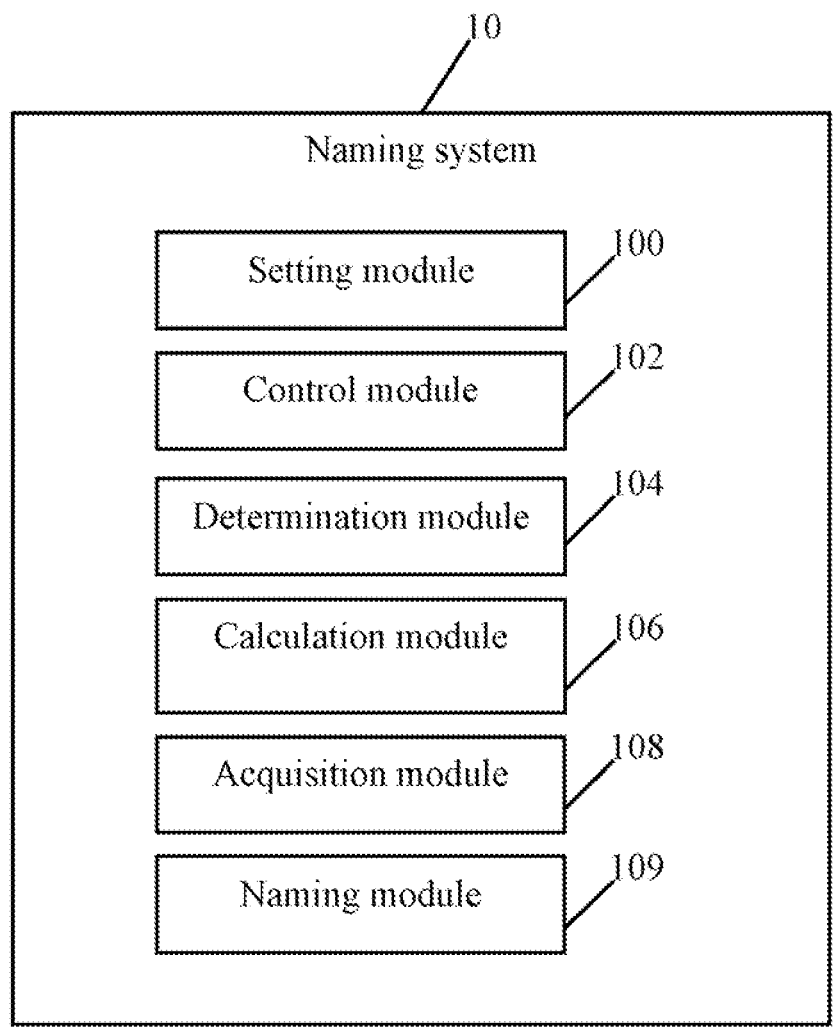
FIG. 2 is a block diagram of function modules of the naming system in the electronic device.

FIG. 2 is a block diagram of function modules of the naming system 10 included in the electronic device 1. In one embodiment, the naming system 10 may include one or more modules, for example, a setting module 100, a control module 102, a determination module 104, a calculation module 106, an acquisition module 108, and a naming module 109. In general, the word "module," as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 5:
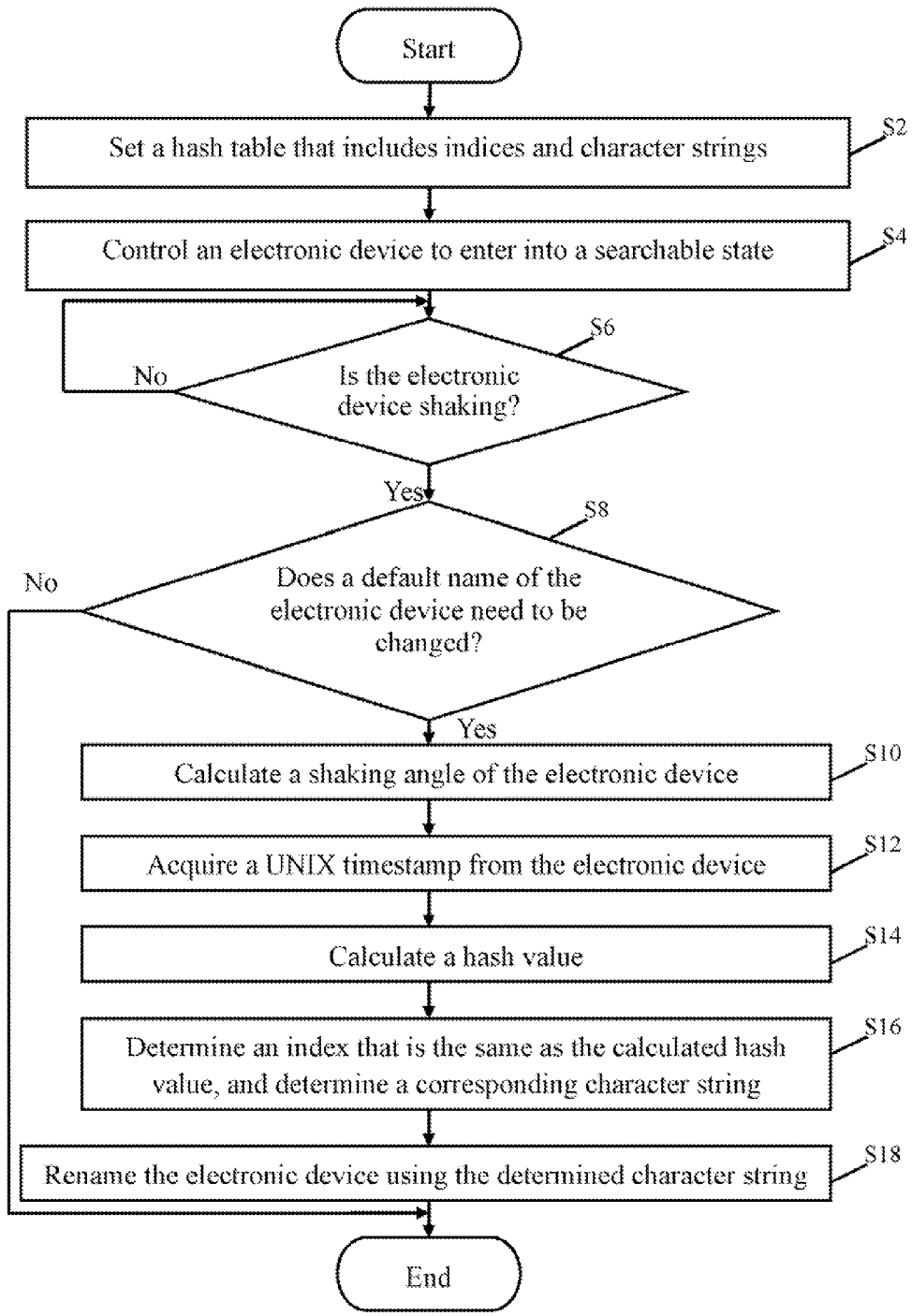
FIG. 5 is a flowchart of one embodiment of a method for managing names of electronic device using the naming system.

FIG. 5 is a flowchart of one embodiment of a method for managing names of electronic device using the naming system 10. Depending on the embodiment, additional steps may be added, others removed, and the ordering of the steps may be changed.

In step S2, the setting module 100 sets a hash table, and stores the hash table in the storage device 12. As shown in FIG. 3, an exemplary hash table includes a plurality of indices and corresponding predetermined character strings. Each of the indices corresponds to a character string. In some embodiments, the character strings are used to name the electronic device 1.

For example, in FIG. 3, an index "1" corresponds to a character string "I am Hank," an index "2" corresponds to a character string "Hi, are you looking for me? I am here."

In other embodiments, the setting module 100 predetermines the character strings according to user input, and presets formats or limitations of the character strings. For example, as shown in FIG. 3, the setting module 100 may insert specified characters (e.g., "*," or "@") before and/or after a character string "I am Tom."

In step S4, the control module 102 controls the electronic device 1 to enter into a searchable state to allow the electronic device 1 to be searched by other electronic devices (hereinafter the "other electronic devices" are referred to as a "target electronic devices"). For example, when the electronic device 1 is in the searchable state, the target electronic device may find the electronic device 1, and request a wireless connection (e.g., BLUETOOTH™, WIFI™) with the electronic device 1.

In some embodiments, the control module 102 inserts a default name of the electronic device 1 in a searchable device list. For example, the default name of the electronic device 1 may be an original name preset when the electronic device 1 is manufactured, such as ABC123, where "ABC" represents a trademark of the electronic device 1, and "123" represents a model number. The default name also may be preset by a user of the electronic device 1, such as Hank, for example.

In step S6, the determination module 104 detects whether the electronic device 1 is shaking using the gravity sensor 14. If the electronic device 1 is shaking, the procedure goes to step S8. If the electronic device 1 is not shaking, step S6 is repeated.

In some embodiments, shaking the electronic device 1 is a predetermined gesture to invoke a renaming procedure to update the default name of the electronic device when the electronic device is in the searchable state. In other embodiments, before invoking the renaming procedure, a prompt message is outputted to prompt the user in step S8.

In step S8, the determination module 104 outputs the prompt message to prompt the user whether the default name of the electronic device 1 needs to be changed, receives user input and determines whether the default name of the electronic device 1 needs to be changed according to the user input. For example, the prompt message may be displayed on the display device 13.

If the default name of the electronic device 1 needs to be changed, the procedure goes to step S10. If the default name of the electronic device 1 does not need to be changed, the procedure ends.

Figure 4:
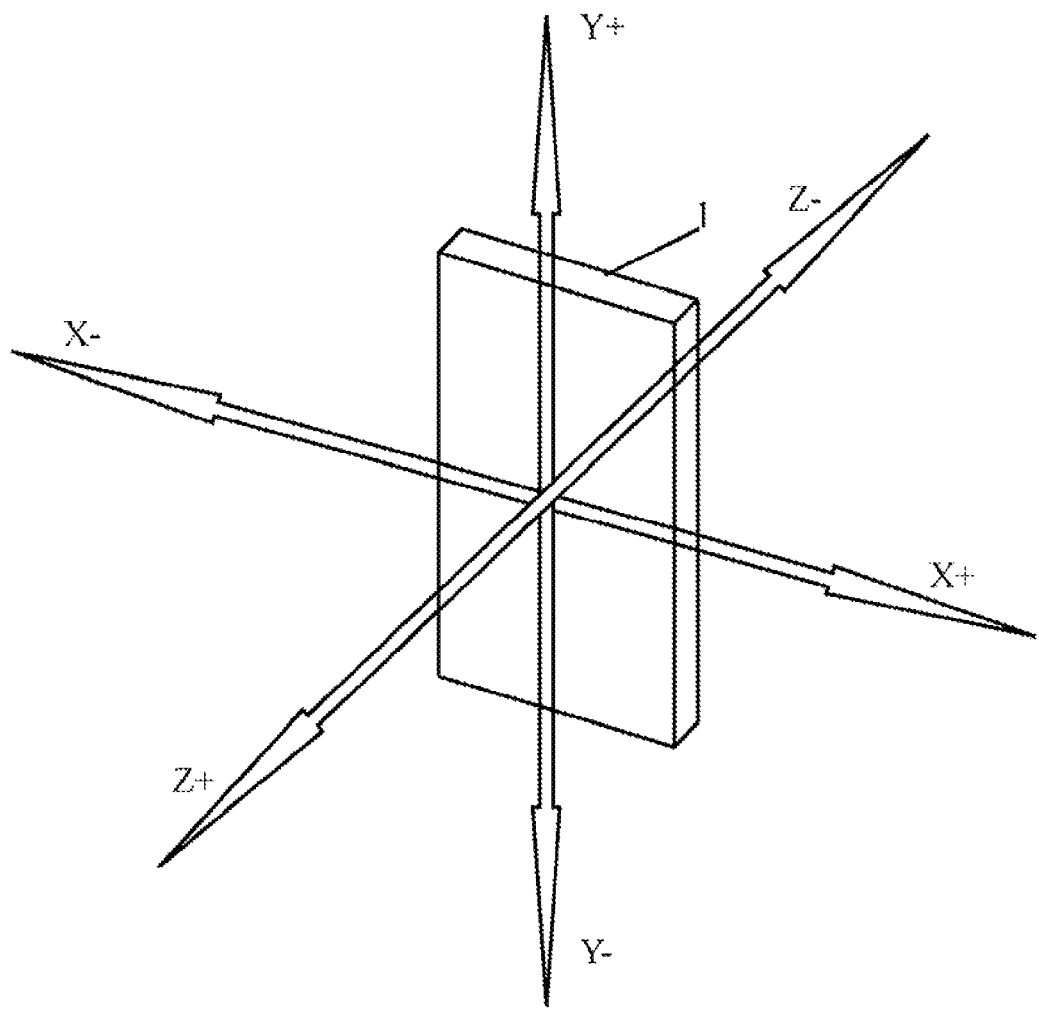
FIG. 4 is a schematic diagram of one embodiment of a three-dimension coordinate system on the electronic device of FIG. 1.

In step S10, the calculation module 106 calculates a shaking angle of the electronic device 1 according to detected coordinate values acquired from the gravity sensor 14. As shown in FIG. 4, a 3D coordinate system based on the center of the electronic device 1 is constructed. Axes of X, Y, and Z in FIG. 4 are merely one example, and may be changed according to user requirements. In other embodiments, a 2D coordinate system may be constructed on the electronic device 1. In some embodiments, the shaking angle may be calculated according to a formula of "θ={arctan [Y÷(−X)]×180}÷π," "θ" represents the shaking angle, "X" and "Y" represent the detected coordinate values. In some embodiments, coordinate values of X and Y are selected to calculate the shaking angle. For example, x=0.2, y=7.4, π=3.14, θ={arctan [7.4÷(−0.2)]×180}÷3.14=−88.5°.

In step S12, the acquisition module 108 acquires a UNIX timestamp from the electronic device 1. In some embodiments, the acquisition module 108 may acquire the UNIX timestamp of the electronic device 1 using application programming interface (API) functions.

In step S14, the calculation module 106 calculates a hash value using the shaking angle, the UNIX timestamp, a number of the indices in the hash table, and a predetermined formula. The predetermined formula is "V=abs(T×θ) mod N," where "V" represents the determined hash value, "T" represents the UNIX timestamp, "θ" represents the shaking angle, and "N" represents the number of the indices in the hash table.

For example, T=1334204567, θ=−88.45, N=100, V=abs (1334204567*−88.45) mod 100=118010393951.15 mod 100=51.15, and then an integer "51" is determined to be the hash value.

In step S16, the naming module 109 determines an index that is the same as the calculated hash value, and determines a character string corresponding to the determined index. For example, as shown in FIG. 3, the determined character string that corresponds to the hash value "51" is "@I am Tom@."

In step S18, the naming module 109 renames the electronic device using the determined character string. Accordingly, by utilizing the above mentioned steps, the electronic device 1 may be renamed easily by performing the predetermined gesture when the electronic device 1 is in the searchable state, and the target electronic devices may find the electronic device 1 quickly.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for naming an electronic device, the electronic device comprising a gravity sensor, the method comprising:
   setting a hash table that comprises indices, each of the indices corresponding to a character string;
   controlling the electronic device to enter into a searchable state, and inserting a default name of the electronic device in a searchable device list;
   determining whether the default name of the electronic device needs to be changed when the electronic device is detected to be shaking using the gravity sensor;
   calculating a shaking angle of the electronic device according to detected coordinate values acquired from the gravity sensor, when the default name of the electronic device needs to be changed;
   acquiring a UNIX timestamp from the electronic device;
   calculating a hash value using the shaking angle, the UNIX timestamp, a number of the indices in the hash table, and a predetermined formula;
   determining an index that is the same as the calculated hash value, and determining a character string corresponding to the determined index; and
   renaming the electronic device using the determined character string.

2. The method according to claim 1, wherein the shaking angle is calculated according to a formula of θ={arctan [Y÷(−X)]×180}÷π, θ represents the shaking angle, X and Y represent the detected coordinate values.

3. The method according to claim 1, wherein the predetermined formula is V=abs(T×θ) mod N, V represents the determined hash value, T represents the UNIX timestamp, θ represents the shaking angle, and N represents the number of the indices in the hash table.

4. The method according to claim 1, further comprising:
   outputting a prompt message to prompt a user whether the default name of the electronic device needs to be changed when the electronic device is shaking; and
   receiving user input and determining whether the default name of the electronic device needs to be changed according to the user input.

5. The method according to claim 1, further comprising:
    determining that the default name of the electronic device needs to be changed when the electronic device is shaking in the searchable state.

6. The method according to claim 1, wherein the searchable state allows the electronic device to be searched by other electronic devices.

7. An electronic device, comprising:
    a gravity sensor;
    a storage device;
    at least one processor; and
    one or more modules that are stored in the storage device and are executed by the at least one processor, the one or more modules comprising:
        a setting module that sets a hash table that comprises indices, each of the indices corresponding to a character string;
        a control module that controls the electronic device to enter into a searchable state, and inserts a default name of the electronic device in a searchable device list;
        a determination module that determines whether the default name of the electronic device needs to be changed when the electronic device is detected to be shaking using the gravity sensor;
        a calculation module that calculates a shaking angle of the electronic device according to detected coordinate values acquired from the gravity sensor, when the default name of the electronic device needs to be changed;
        an acquisition module that acquires a UNIX timestamp from the electronic device;
        the calculation module that calculates a hash value using the shaking angle, the UNIX timestamp, a number of the indices in the hash table, and a predetermined formula; and
        a naming module that determines an index that is the same as the calculated hash value, determines a character string corresponding to the determined index, and renames the electronic device using the determined character string.

8. The electronic device according to claim 7, wherein the shaking angle is calculated according to a formula of $\theta=\{\arctan[Y\div(-X)]\times180\}\div\pi$, $\theta$ represents the shaking angle, X and Y represent the detected coordinate values.

9. The electronic device according to claim 7, wherein the predetermined formula is $V=abs(T\times\theta) \bmod N$, V represents the determined hash value, T represents the UNIX timestamp, $\theta$ represents the shaking angle, and N represents the number of the indices in the hash table.

10. The electronic device according to claim 7, wherein the determination module further outputs a prompt message to prompt a user whether the default name of the electronic device needs to be changed when the electronic device is shaking, and receives user input and determines whether the default name of the electronic device needs to be changed according to the user input.

11. The electronic device according to claim 7, wherein the determination module further determines that the default name of the electronic device needs to be changed when the electronic device is shaking in the searchable state.

12. The electronic device according to claim 7, wherein the searchable state allows the electronic device to be searched by other electronic devices.

13. A non-transitory storage medium having stored thereon instructions that, when executed by a processor of an electronic device, causes the electronic device to perform a method for naming the electronic device, the electronic device comprising a gravity sensor, the method comprising:
    setting a hash table that comprises indices, each of the indices corresponding to a character string;
    controlling the electronic device to enter into a searchable state, and inserting a default name of the electronic device in a searchable device list;
    determining whether the default name of the electronic device needs to be changed when the electronic device is detected to be shaking using the gravity sensor;
    calculating a shaking angle of the electronic device according to detected coordinate values acquired from the gravity sensor, when the default name of the electronic device needs to be changed;
    acquiring a UNIX timestamp from the electronic device;
    calculating a hash value using the shaking angle, the UNIX timestamp, a number of the indices in the hash table, and a predetermined formula;
    determining an index that is the same as the calculated hash value, and determining a character string corresponding to the determined index; and
    renaming the electronic device using the determined character string.

14. The non-transitory storage medium according to claim 13, wherein the shaking angle is calculated according to a formula of $\theta=\{\arctan[Y\div(-X)]\times180\}\div\pi$, $\theta$ represents the shaking angle, X and Y represent the detected coordinate values.

15. The non-transitory storage medium according to claim 13, wherein the predetermined formula is $V=abs(T\times\theta) \bmod N$, V represents the determined hash value, T represents the UNIX timestamp, $\theta$ represents the shaking angle, and N represents the number of the indices in the hash table.

16. The non-transitory storage medium according to claim 13, wherein the method further comprises:
    outputting a prompt message to prompt a user whether the default name of the electronic device needs to be changed when the electronic device is shaking; and
    receiving user input and determining whether the default name of the electronic device needs to be changed according to the user input.

17. The non-transitory storage medium according to claim 13, wherein the method further comprises:
    determining that the default name of the electronic device needs to be changed when the electronic device is shaking in the searchable state.

18. The non-transitory storage medium according to claim 13, wherein the searchable state allows the electronic device to be searched by other electronic devices.

* * * * *